United States Patent [19]
Wiss

[11] 3,855,986
[45] Dec. 24, 1974

[54] REFLECTIVELY COATED COMBUSTION CHAMBER FOR INTERNAL COMBUSTION ENGINES AND METHOD OF USING SAME

[76] Inventor: John W. Wiss, 3316 Brookdale Dr., Pittsburgh, Pa. 15241

[22] Filed: Mar. 15, 1972

[21] Appl. No.: 234,857

[52] U.S. Cl. .................................. 123/191 A, 123/1
[51] Int. Cl. ............................................ F02b 23/00
[58] Field of Search ................. 123/191 A, 97 B, 1; 92/223

[56] References Cited
UNITED STATES PATENTS

| | | | |
|---|---|---|---|
| 2,075,388 | 3/1937 | De Cloud | 123/191 A X |
| 2,817,562 | 12/1957 | Fleming et al. | 92/223 X |
| 2,873,733 | 2/1959 | Hicks | 123/191 A |
| 2,978,360 | 4/1961 | Bradstreet et al. | 123/191 A |
| 3,066,663 | 4/1962 | Rudy | 123/191 A |
| 3,152,523 | 10/1964 | Whitfield et al. | 123/191 A |
| 3,422,803 | 1/1969 | Stivender | 123/97 B |
| 3,459,167 | 8/1969 | Briggs et al. | 123/191 A |
| 3,552,370 | 1/1971 | Briggs | 123/191 A |

OTHER PUBLICATIONS
Society of Automotive Engineers Transactions Vol. 70, 1962 pages 195–202.

*Primary Examiner*—Wendell E. Burns
*Attorney, Agent, or Firm*—John J. Byrne

[57] ABSTRACT

A method and structure for decreasing obnoxious exhaust emissions from internal combustion, spark ignition engines such as the conventional automotive gasoline engines by operating same at a lean air-fuel ratio in combustion chambers whose surface material is highly reflective to infrared rays.

8 Claims, 4 Drawing Figures

REFLECTIVELY COATED COMBUSTION CHAMBER FOR INTERNAL COMBUSTION ENGINES AND METHOD OF USING SAME

The principal pollutants from the internal combustion, spark ignition engine have been recognized as carbon monoxide (CO), unburned hydrocarbons (HC) and oxides of nitrogen ($NO_x$). CO and HC are products of incomplete combustion. $NO_x$, in the form of nitrogen oxide (NO), is principally formed from the hot nitrogen ($N_2$) and oxygen ($O_2$) of the air.

Figure 1:
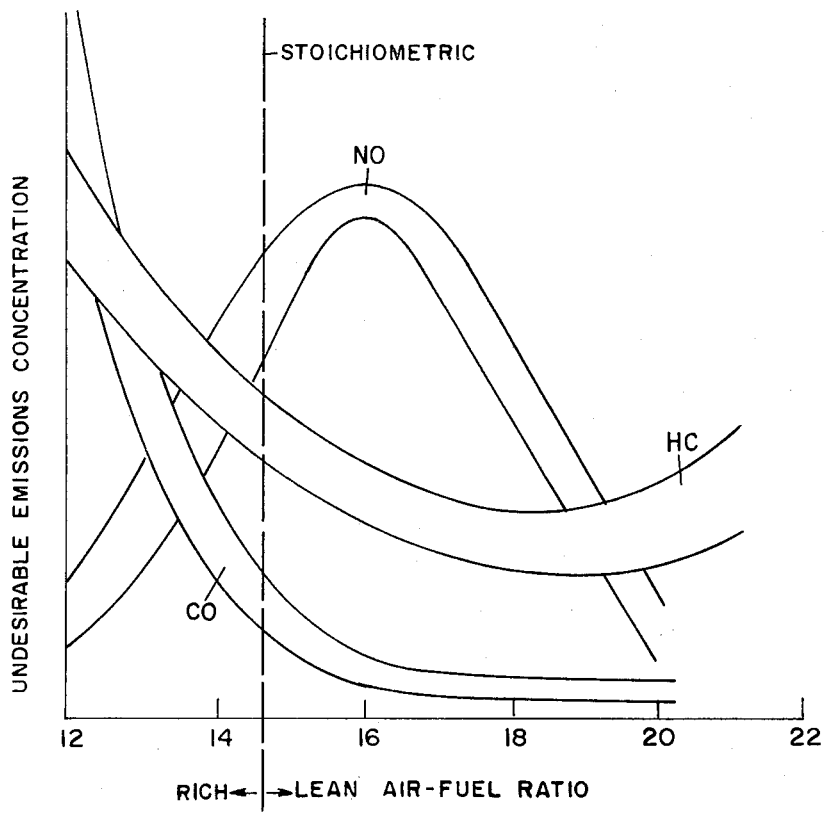

A principal objective of this invention is to provide an engine that gives off a greatly decreased amount of these pollutants, when compared with conventional practice, through the use of combustion chambers that are highly reflective in the infrared region and operate at lean air-fuel ratios. The diagram, FIG. 1, is a stylized representation of the amount of these pollutants emitted by a conventional automotive engine, at differing ratios of air to fuel. Examination of this diagram indicates the possibility of achieving low $NO_x$ at air-fuel ratios noticeably richer or leaner than stoichiometric. Practical limitations, however, have previously restricted satisfactory operation to a rather narrow range near the stoichiometric value. Operation at air-fuel ratios richer in fuel tend to give large amounts of CO and HC, while leaner operation gives misfiring and higher HC.

Previous attempts to improve the emission characteristics of conventional automotive engines have involved better conditions in the combustion chamber, the use of reaction chambers in the exhaust stream, or both. The rather broad range of values in FIG. 1 indicates the margin for improvement in ordinary combustion-chamber conditions. Exhaust reactor systems, while often effective, may be expensive and bulky.

Another emission-improvement procedure in prior art is the recirculation of exhaust gases into the incoming air-fuel mixture. While this approach has decreased $NO_x$, it apparently decreases fuel economy and driveability, and may be detrimental to engine cleanliness and maintainability.

A still further objective of this invention is to provide a method of operating an internal combustion engine which includes the steps of coating the combustion chamber surfaces with a substance highly reflective to infrared radiation and operating the engine at air-fuel mixture greater than stoichiometric. The effect of the coated surface and the lean mixture reduces the exhaust of harmful $NO_x$, CO, and HC.

A still further objective of the invention is to provide a coating for combustion chambers having reflective characteristics, that also provides a catalytic action, aiding in the reduction of harmful exhaust emissions.

A further objective of this invention is to provide an engine wherein exhaust emissions are efficiently controlled. This objective is accomplished by using a combustion chamber coated with a reflective material and operating with a lean air-fuel ratio. Heat losses are abated, permitting a broader operating tolerance in the combustion process.

A still further objective of this invention is to provide an economical and efficient method of simultaneously decreasing noxious emissions such as nitrogen oxide, carbon monoxide, and hydrocarbons, without incurring the costs associated with other methods of achieving this objective.

Another important objective of this invention is to reduce emissions, especially $NO_x$, HC and CO from a combustion chamber by providing a durable and reliable reflective oxide coating having a catalytic as well as a reflective effect with a resulting effect of conserving heat and decreasing the freezing of nitrogen oxides.

There is general agreement that the formation of nitrogen oxide (NO) in spark-ignition engine cylinders is a non-equilibrium process controlled by chemical kinetics. Nitrogen ($N_2$) and oxygen ($O_2$) are heated by the combustion of fuel and air, and react to form NO. Under "equilibrium" conditions, where adequate time is available for the chemical reaction to occur, the concentration of NO is determined by the concentrations of $N_2$ and $O_2$, and the temperature of combustion. A higher temperature would give a higher NO concentration. Also, the NO will return to $N_2$ and $O_2$ when the gases are slowly cooled. This "equilibrium" relationship is conventionally expressed by the chemical formula $N_2 + O_2 \rightleftarrows 2 NO$. However, in a real engine there is inadequate time for equilibrium in either direction, although at the temperatures of engine combustion the NO formation reaction rate is known to be greater than the rate of its breakdown reaction. Combustion takes place rapidly, compared with the NO formation reaction. The NO concentration therefore does not usually rise to its full "equilibrium" value. During and after the combustion process, the glowing gases give off large amounts of heat by radiation and convection to the cooler walls of the combustion chamber. The heat transfer by infrared radiation occurs at essentially the speed of light, so it is much faster than the chemical reactions involved. Many hot NO molecules give off quanta of infrared energy and rapidly drop in temperature to a state where the chemical breakdown reaction is extremely slow. This is known as "freezing" the NO. Some No molecules strike nearly cooler objects and give up heat by convection, similarly "freezing" themselves as NO. Other combustion products such as water ($H_2O$) and carbon dioxide ($CO_2$) similarly cool themselves below the temperatures where they decompose significantly.

It is well known that hot gaseous molecules such as NO, $H_2O$, $CO_2$, $N_2$ and $O_2$, typically emit infrared energy in discrete quanta at discrete frequencies and absorb infrared energy in these same quanta and at these same frequencies, said quanta and frequencies being definite physical characteristics of said molecules.

Conventional materials used in or deposited on combustion chamber walls absorb a significant portion of the infrared energy incident upon their surfaces, converting that energy to heat, which is subsequently rejected to the engine's cooling system. This energy is therefore not reflected or radiated back to the gases.

In my invention, the materials used in or deposited on the combustion chamber walls are highly reflective in the infrared frequency range where most of the hot combustion gaseous infrared emission occurs. The energy quanta emitted by the gases are reflected from the wall surfaces and, in a large proportion of cases, are absorbed by gaseous molecules. This permits the gases to cool through molecular diffusion and other convective processes, which are much slower than the radiation process. This cooling continues during the expansion portion of the engine cycle. The NO is therefore permitted to decrease its temperature at a more leisurely rate, and spend a significant portion of time in the temperature range where the NO breakdown reaction to $N_2$ and $O_2$ can occur with a reasonable yield. Additionally, the reflective walls decrease the cooling rate of the combustion process, thereby tending to speed up the combustion rate. This gives NO less time to form during combustion. The reduction in energy loss from the combustion process also permits combustion to occur in leaner mixtures of fuel and air, thereby promoting better combustion and decreasing NO through decreased peak temperatures.

Figure 2:
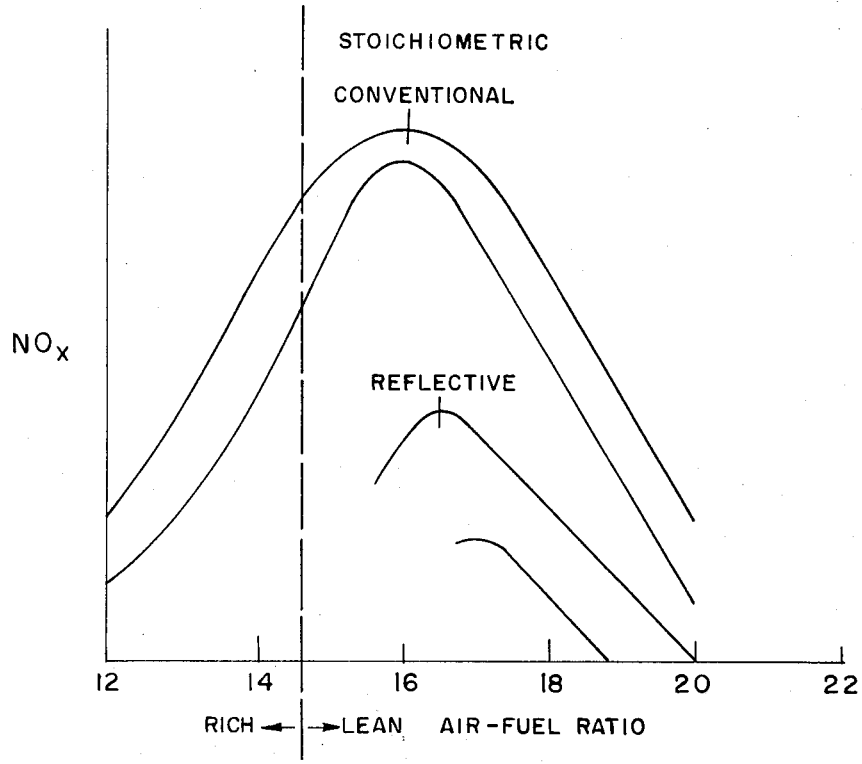

Experiments indicate that the amount of NO generated in a reflective combustion chamber is approximately half that generated in a similar conventional combustion chamber operated under equivalent conditions of mixture ratio, as indicated in FIG. 2.

Experiments also indicate that best results in using a reflective combustion chamber require optimization of the conventional variables available to the engine designer. Ignition timing, valve timing, mixture distribution, mixture programming, and intake mixture temperature are several of the operating parameters that should be optimized.

Recently, there has been much interest in lean air-fuel mixtures in conventional engines as a means for reducing exhaust emissions. With lean mixtures there is a resulting low concentration of oxides of nitrogen as well as carbon monoxide in the exhaust gases. However, if the mixture is weakened to a considerable extent over the stoichiometric, many difficulties are encountered including higher fuel consumption, rough engine operation and increased hydrocarbon emission caused by misfiring and increased cycle-to-cycle combustion variations. Therefore, another principal objective of this invention is to provide means for permitting lean air-fuel operation without these difficulties.

Figure 3:
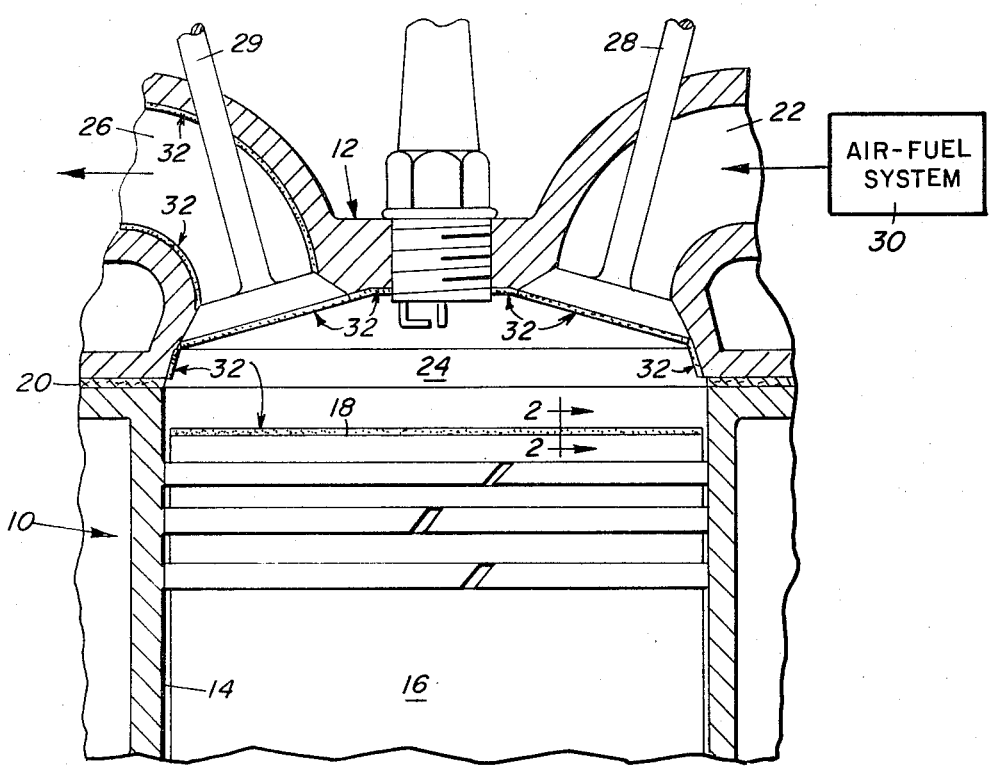
Figure 4:
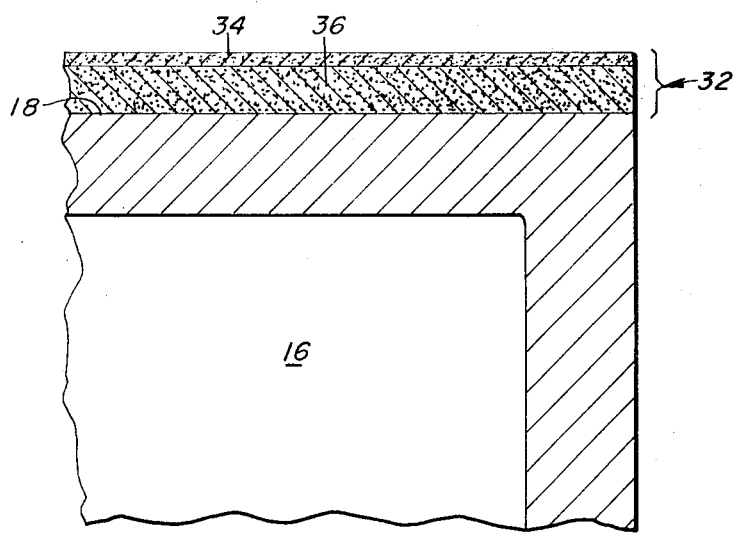

These and other objectives of the invention will become more apparent to those skilled in the art by reference to the following detailed description when viewed in light of the accompanying drawings wherein:

FIG. 1 is a chart, graphically showing certain emissions of conventional prior art engines plotted with respect to air-fuel ratios, FIG. 2 is a chart similar to FIG. 1 graphically showing an $NO_x$ curve when using the reflective surfaces of this invention, compared with the $NO_x$ curve of conventional prior art, FIG. 3 is a fragmentary, sectional, elevational view, of a reciprocating, spark-ignition engine showing typical reflective surfaces, and FIG. 4 is a cross-sectional view along the line 2—2 of FIG. 3.

Referring now to the drawings wherein like elements are indicated by like numerals, numeral 10 indicates the block of a spark-ignition internal combustion engine and the head thereof is indicated by the numeral 12. As is conventional a plurality of cylinders are formed in the block, one of which is indicated by the numeral 14. In each of the cylinders 14 is a piston 16 having an upper surface 18. A gasket 20 is shown between the head 12 and the block 10.

An intake passageway 22 delivers an air-fuel mixture to the combustion chamber 24. Exhaust emissions leave the combustion chamber 24 through a passageway 26 under the control of the valve member 29. An air-fuel mixer 30 of conventional design for delivering an air-fuel mixture in excess of stoichiometric is disclosed diagramatically. The coating of the inner surfaces of the combustion chamber 24 are collectively indicated by the numeral 32. The intake valve is indicated by the numeral 28.

Only the layer 32 of surface 18 will be described in detail, it being understood that other portions of surface 32 are likewise coated. In the embodiment disclosed the inner surface of cylinder 14 is not coated for reasons of economy. However, it is contemplated that it may be coated in the future in cases where its contribution is desired. The coating is a material highly reflective to the radiant energy emitted by the combustion flame. Since most of this energy is in the red and near-infrared regions of the electromagnetic spectrum, the coating 32 is made particularly reflective in the wave length region of from 1 to 5 microns.

Several metallic oxides such as oxides of aluminum, copper, titanium and zirconium as well as some metals such as copper, gold and silver have been found suitably reflective for the purposes intended. Cuprous and aluminum oxides are convenient, economical and durable as reflecting surfaces. It should be recognized however, that other suitable materials exist. The coatings may be manufactured by a multiplicity of means, including flame spray or plasma spray, buildup from pressed and sintered powders, electrodeposition, inserts in castings, explosive or diffusion bonding, mechanical fixation, or other processes familar to the manufacturing arts.

The material of piston 16, valves 28 and 29 and the head 12 often have coefficients of expansion different from the above-mentioned reflective oxides. In some cases a suitable transition layer is desirable to minimize thermal stresses engendered by this difference. For example, when aluminum oxide or zirconium oxide is used as the infrared reflector it has been found convenient to utilize a transitional layer of titanium or titanium alloy 36 between the piston 16 and the reflective layer 34. Cuprous oxides can be formed on copper, conventionally applied to many substrate materials such as cast iron, steel, and aluminum alloy. The aluminum oxides can be generated on aluminum surfaces by several means including anodizing. These coatings may in some circumstances contain other substances such as fluorocarbon or fluorosilicon polymers to decrease the possible unfavorable effects of carbon and/or lead deposits caused by combustion, or other deleterious environmental effects.

It has also been found desirable to use some of the preferred coating systems as thermal barriers in exhaust systems, to maintain high exhaust gas temperatures and thereby permit decreases in exhaust emissions, particularly of HC and CO.

Note that the exhaust passageway or stack 26 can also be coated or layered (also indicated by the numeral 32) in the fashion of the combustion chamber. This results in a further conservation of heat to aid the aforementioned advantages and objectives.

Others have observed the influence of infrared energy and its reflection in internal combustion engines. For example, Briggs et al., (U.S. Pat. Nos. 3,459,167; 3,552,370; 3,583,290) used infrared reflective surfaces in conjunction with insulating material in order to improve the durability, efficiency, and operation of diesel engines. Decrease of nitrogen oxides in automobile engines is not contemplated by these teachings, and use with insulating substrates was considered essential.

Many students of combustion, best summarized by Annand have estimated that radiant heat transfer is only a small portion of total heat transfer in spark-ignition engines; however, other investigators such as the U.S. Bureau of Mines have shown that much of this radiation occurs in the immediate vicinity of the flame front, and the instantaneous radiant heat transfer rates can be quite high. It is these peak values and their reflection that are important to this invention.

In a general manner, while there has been disclosed an effective and efficient embodiment of the invention, it should be well understood that the invention is not limited to such embodiments, as there might be changes made in the arrangement, disposition, and form of the parts without departing from the principle of the present invention as comprehended within the scope of the accompanying claims.

I claim:

1. A process for reducing noxious exhaust emissions from a spark-ignition engine comprising the steps of
   providing an infrared reflecting surface highly reflective to infrared radiation in the 1 to 5 micron range to the walls of the combustion chambers of said engine while
   operating said engine at air-fuel ratios greater than 17 but less than 22.

2. A spark-ignition internal combustion engine having combustion chambers comprising
   coating means on the surfaces of said combustion chambers of an infrared reflecting material highly reflective in the 1–5 micron range for preventing a relatively large proportion of the nitrogen oxides, which are conventionally developed, from being formed at combustion and to cause them to revert to molecules of nitrogen and oxygen prior to exhaust to the atmosphere, and
   control means providing an air-fuel mixture to said chambers at an air-fuel ratio greater than 17 but less than 22.

3. The invention of claim 2 wherein said coating is applied over a layer of titanium.

4. The invention of claim 2 wherein said coating is applied over a layer of titanium alloy.

5. The invention of claim 2 wherein said coatings include a coating of cuprous oxide developed on a substrate of the parent metal of said surfaces.

6. The invention of claim 2 wherein said coatings include a coating of aluminum oxide developed on a substrate of the parent metal of said surfaces.

7. The invention of claim 2 wherein said coating includes a fluorocarbon to prevent the adherence of undesirable combustion chamber deposits.

8. The invention of claim 2 wherein said coating includes a fluorosilicone to prevent the adherence of undesirable combustion chamber deposits.

* * * * *